(12) United States Patent
Deppieri et al.

(10) Patent No.: US 10,802,498 B2
(45) Date of Patent: Oct. 13, 2020

(54) TARGET DIRECTION ESTIMATION USING CENTROID FOLLOWER

(71) Applicant: Datalogic IP Tech S.r.l., Lippo di Calderara di Reno (IT)

(72) Inventors: Francesco Deppieri, Gambarare di Mira (IT); Vittorio Rago, San Giovanni in Persiceto (IT)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 224 days.

(21) Appl. No.: 15/993,329

(22) Filed: May 30, 2018

(65) Prior Publication Data

US 2019/0369633 A1 Dec. 5, 2019

(51) Int. Cl.
*G05D 1/02* (2020.01)

(52) U.S. Cl.
CPC ......... *G05D 1/0246* (2013.01); *G05D 1/0234* (2013.01)

(58) Field of Classification Search
CPC .. G06K 7/1473; G06K 7/1098; G05D 1/0246; G05D 1/0234
See application file for complete search history.

(56) References Cited

U.S. PATENT DOCUMENTS

| | | | |
|---|---|---|---|
| 5,911,767 A * | 6/1999 | Garibotto | G01S 3/783 348/119 |
| 6,256,560 B1 | 7/2001 | Kim et al. | |
| 6,604,682 B2 | 8/2003 | Wakamiya et al. | |
| 9,818,197 B2 | 11/2017 | Viti et al. | |
| 2005/0107947 A1 | 5/2005 | Han et al. | |
| 2014/0277691 A1* | 9/2014 | Jacobus | B66F 9/063 700/216 |
| 2019/0138978 A1* | 5/2019 | Johnson | G06Q 10/08 |
| 2019/0243358 A1* | 8/2019 | Jaquez | G05D 1/0238 |

FOREIGN PATENT DOCUMENTS

CN 105966259 A 9/2016

OTHER PUBLICATIONS

Prasad, D.K., Leung, M.K.: Methods for Ellipse Detection from Edge Maps of Real Images. Machine Vision-Applications and Systems, 135-162 (2012).
Kabuka M et al: "Position verification of a mobile robot using standard pattern", IEEE Journal on Robotics and Automation, IEEE, USA, vol. 3, No. 6, Dec. 1, 1987 (Dec. 1, 1987), pp. 505-516, XP011217443, ISSN: 0882-4967, DOI:10.1109/JRA.1987.1087143 section IV; figure 5.
International Search Report dated Jul. 25, 2019 in International Patent Application No. PCT/EP2019/063541, 14 pages.

* cited by examiner

*Primary Examiner* — Jess Whittington
(74) *Attorney, Agent, or Firm* — Shook, Hardy & Bacon, L.L.P.

(57) ABSTRACT

An automated guided vehicle (AGV) has an image reader that scans indicia located on a floor. The image reader scan the indicium to obtain instructions for the AGV to follow. A processor in the AGV can perform geometry estimation of ellipsoidal objects in order to align the AGV as it moves or is stopped along a path.

19 Claims, 8 Drawing Sheets

TARGET DIRECTION ESTIMATION USING CENTROID FOLLOWER

CROSS-REFERENCE TO RELATED APPLICATIONS

None.

BACKGROUND

Detecting shapes like ellipses from real images have much potential. Some examples include detecting ellipsoidal objects from a scene for robotic applications. Ellipse (or circle) geometry estimation is used in real time and time critical applications, such as indicia recognition for automated guided vehicles guidance or two-dimensional barcode decoding, such as MaxiCode.

Accurate and reliable geometric estimation of a shape is a key factor in Automated Guide Vehicles (AGVs) systems performances.

See U.S. Pat. No. 6,256,560 as an example of position and direction correction of an AGV using shapes. The effect of a perspective distortion combined with other geometrical distortions (e.g. skews due to a slope) on a target can introduce uncertainty in direction estimation, reducing the precision of a target positioning.

Many methods have been proposed to detect ellipsoidal shapes and accurately estimate ellipse geometry. See Chapter 2 in Prasad, D. K., Leung, M. K.: *Methods for Ellipse Detection from Edge Maps of Real Images*. Machine Vision-Applications and Systems, 135-162 (2012). Chapter 2 provides a summary of the methods. All methods are 'edge based' and suffer from weak edge acquisition (blur) and noise, or they are computational intensive and not suitable for real time and time critical applications. In case of high skew level, there is an inaccuracy in axes evaluation that can produce erroneous results.

U.S. Pat. No. 6,604,682 by Seiko Corporation, describes a method: "a first step for comparing a detected black and white pattern of a finder patter obtained by scanning in the first scanning direction with a specific black and white reference pattern; a second step for comparing a detected black and white pattern of a finder pattern obtained by scanning in the second scanning direction with a specific black and white reference pattern. See, e.g., U.S. Pat. No. 6,604,682, col. 9, line 18-23.

A solution is needed that allows the geometric estimation of ellipsoidal objects even when the original target is distorted or blurred from acquisition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

We propose a new way for finding ellipticity of a target with concentric crowns that is able to manage strong perspective distortion, out of focus shapes, and crown interruptions. Particularly, an evaluation of the exact center of a circular finder pattern occurs, which leads to a better way of finding pattern distortion in an image, such as an ellipse or circle. Starting from a preliminary center evaluation, an embodiment of the invention starts by evaluating the maximum grey level profile moving from a preliminary center to the last white circular crown in four (4) directions that are located at ninety (90) degrees from an adjacent direction. A centroid is evaluated as a medium point. The calculation at the four (4) directions are repeated moving an axis five (5) degrees before repeating the calculation. A confirmation is made if the centroid is correct. An analysis of the major axis of the ellipse occurs.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
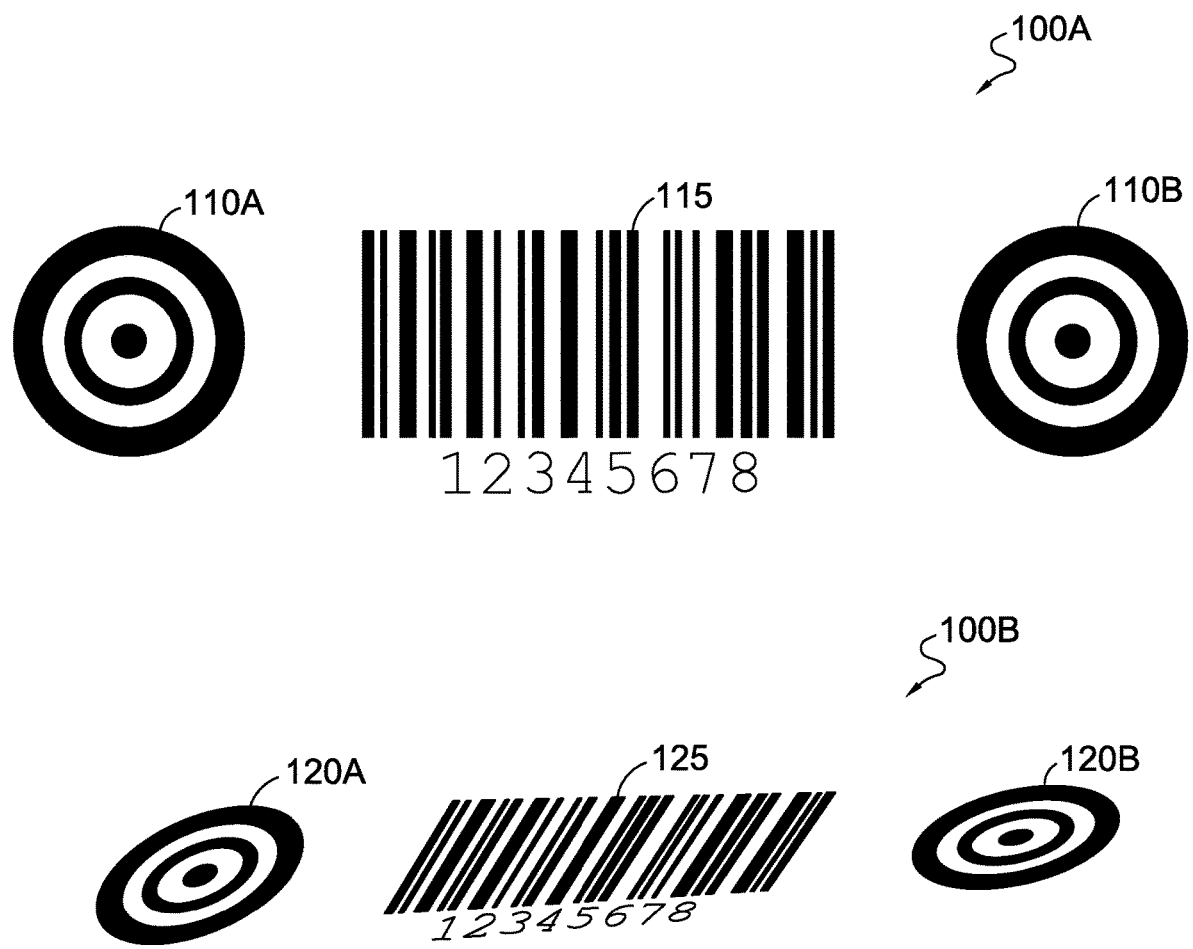
FIG. 1 is an illustration of indicia read by an automated guided vehicle, implemented in accordance with an embodiment of the present invention.

The subject matter of aspects of the present invention is described with specificity herein to meet statutory requirements. However, the description itself is not intended to limit the scope of this patent.

Embodiments of the present invention can be implemented to find the ellipticity of a target with concentric crowns. Particularly, the center of an ellipsoidal shape with concentric crowns can be identified even where the shape is distorted or blurred either at the origin where the shape is found or after the shape has been captured by an imaging device. An ellipsoidal shape or object includes ellipses, circles, and variations of the ellipses and circles in odd-shape forms.

In a first aspect, a system for correcting a position of an Automated Guided Vehicle (AGV) system that moves along a path is provided that includes the AGV system having a processor coupled to a memory. The AGV system includes a scanner with a camera. The AGV system moves along a path in a direction. The scanner scans for indicia on a floor as the AGV system moves along the path. The AGV system stops in a misaligned position. The AGV system stops once the scanner detects a stop indicium. The camera captures the stop indicium. The stop indicium is distorted or appears as a geometrical distortion or the stop indicium is a blurred acquisition after being captured by the camera. The processor performs a geometry estimation on the geometrical distortion or blurred acquisition to correct the misaligned position of the AGV system. The processor estimates the geometry and positions the geometry along axes in a X-Y reference system. The AGV system moves or rotates to a correct aligned position along the path based on the position of the geometry.

In a second aspect, a method for correcting a position of an Automated Guided Vehicle (AGV) system that moves along a path includes operating the AGV system having at least one processor coupled to a memory. The AGV system includes a scanner with a camera. The AGV system moves along a path in a direction. The scanner scans for indicia on a floor as the AGV system moves along the path. The AGV system stops once the scanner detects a stop indicium. The AGV system stops in a misaligned position. The camera captures the stop indicium. The stop indicium is distorted or appears as a geometrical distortion, or the stop indicium is a blurred acquisition after being captured by the camera. A geometry estimation is performed, by the at least one processor, on the geometrical distortion or blurred acquisition to correct the misaligned position of the AGV system. The at least one processor positions the geometry estimation along axes in a X-Y reference system. The AGV system is moved or rotated to a correct aligned position along the path based on the position of the geometry along the axes.

In a third aspect, a system for correcting a position of an Automated Guided Vehicle (AGV) system that moves along a path includes the AGV system having at least one processor coupled to a memory and comprising a scanner with a camera. The AGV system moves along a path in a direction. The scanner scans for indicia on a floor as the AGV system moves along the path. The AGV system moves in a misaligned position relative to the path. The camera captures an indicium. The indicium is distorted or appears as a geometrical distortion, or the indicium is a blurred acquisition after being captured by the camera. The at least one processor performs a geometry estimation on the geometrical distortion or blurred acquisition to correct the misaligned position of the AGV system while the AGV system moves. The at least one processor positions the geometry estimation along axes in a X-Y reference system. The AGV system moves or rotates to a correct aligned position as it moves along the path. The movement or rotation to the correct aligned position is based on the position of the geometry along the axes.

In a fourth aspect, a method for evaluating a distortion of a target with concentric crowns is provided that includes determining a preliminary center position of an ellipse. Two perpendicular axes are determined intersecting in the preliminary center position and four segments that identify four quadrants. At (a), the grey level values of an external crown are evaluated for each of said four segments. At (b), a centroid is calculated for each segment based on said grey level values. At (c), the distances between each centroid and the center are calculated. The segments are rotated a fixed angle. Steps (a), (b), and (c) are repeated. After a rotation of the segments a complete 360 degrees, the distances distribution is analyzed. The maximum value is selected as a major axis.

The present invention is called centroid follower and is based on an idea that analyzing a distribution of selected measures (the distance from the center of a set of points on a crown) in an ellipse geometry is clearly found. The strength of the centroid follower method is its independence from weak edge acquisition, shapes in general, and the correct management of noisy scenes. Using the centroid follower method with readers, such as the Matrix 120 manufactured by Datalogic, S.p.A. of Lippo di Calderara di Reno (Bologna), Italy installed in an automated guided vehicle, a better precision in target detection can be achieved. Additionally, a better decoding rate can be achieved even for damaged or distorted MaxiCode labels scanned by an image reader.

In an embodiment of the present invention, an algorithm can be used to calculate the ellipticity of an ellipsoidal object. First, the starting points as a maximum in the grey level profile are found, moving from a center to a last white circular crown in four outward directions that are ninety (90) degrees to an adjacent direction resulting in approximately four quadrants. There are many methods described in literature to find the preliminary center position of a potential circle/ellipse. For example, in a target like the one presented in FIG. 3, it can be approximately evaluated as the middle point in the inner central peak of 5 consecutive signal peaks, (x2−x1)/2 as found in graph 300A in FIG. 3A.

Figure 3:
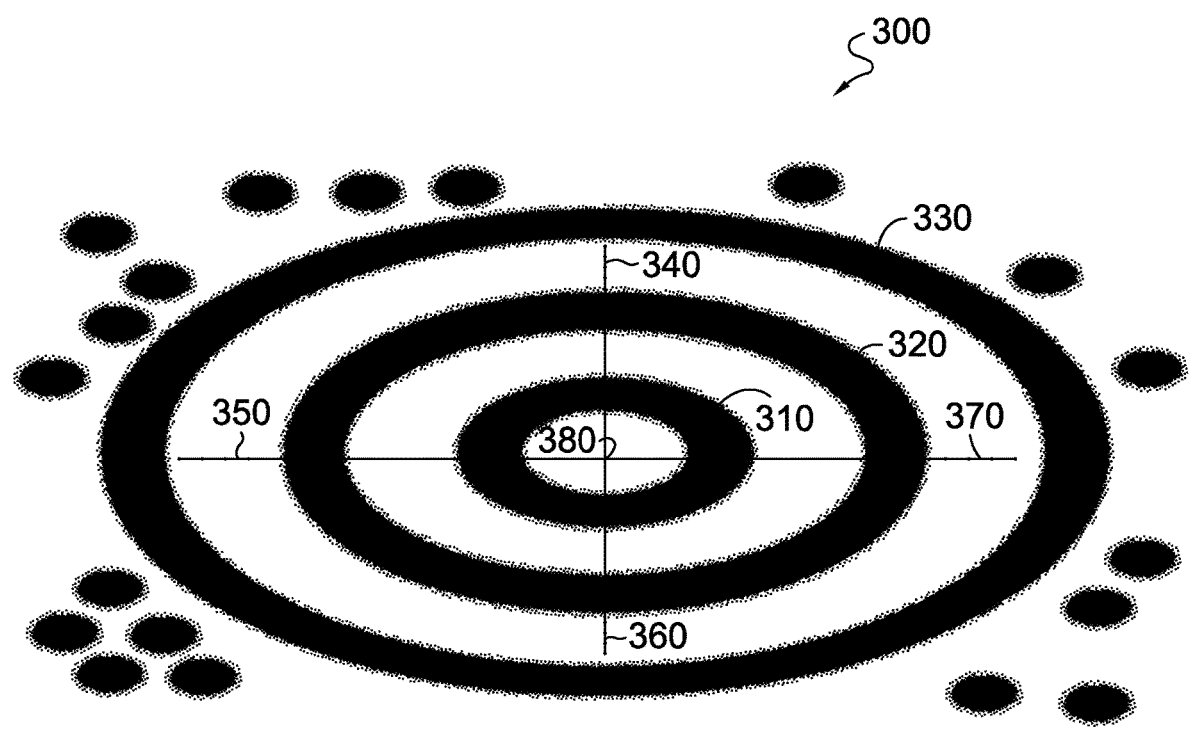
FIG. 3 is an exemplary ellipsoidal object showing the four linear directions and four quadrants, implemented in accordance with an embodiment of the present invention.
Figure 3A:
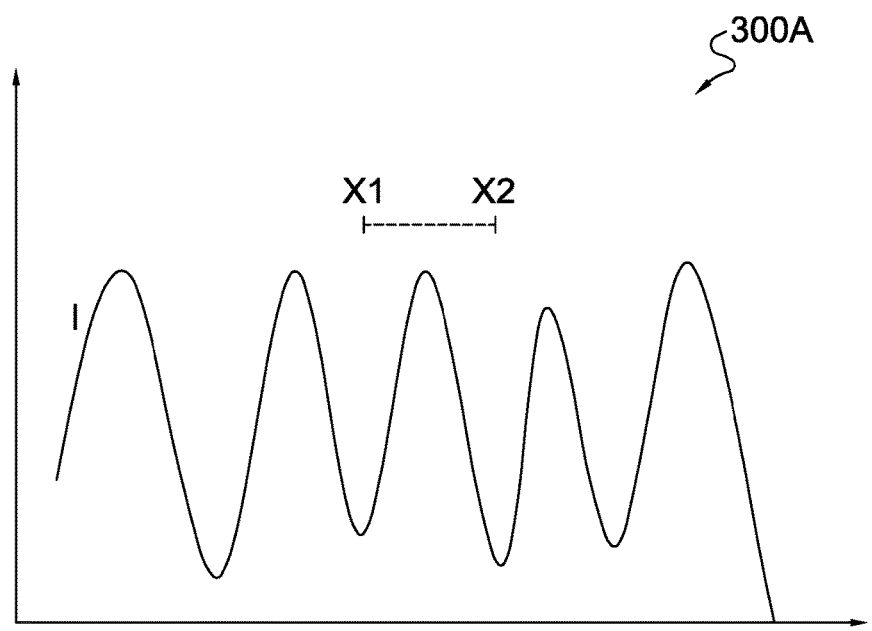
FIG. 3A is an exemplary graph showing a sinusoidal curve, implemented to show an exemplary calculation of a middle point.

In FIG. 3, ellipsoidal object 300 is shown with circular crowns 310, 320, and 330. Directions 340, 350, 360, and 370 are shown with a center starting point 380. Object 300 is similar to the objects found in FIG. 1.

Figure 12:
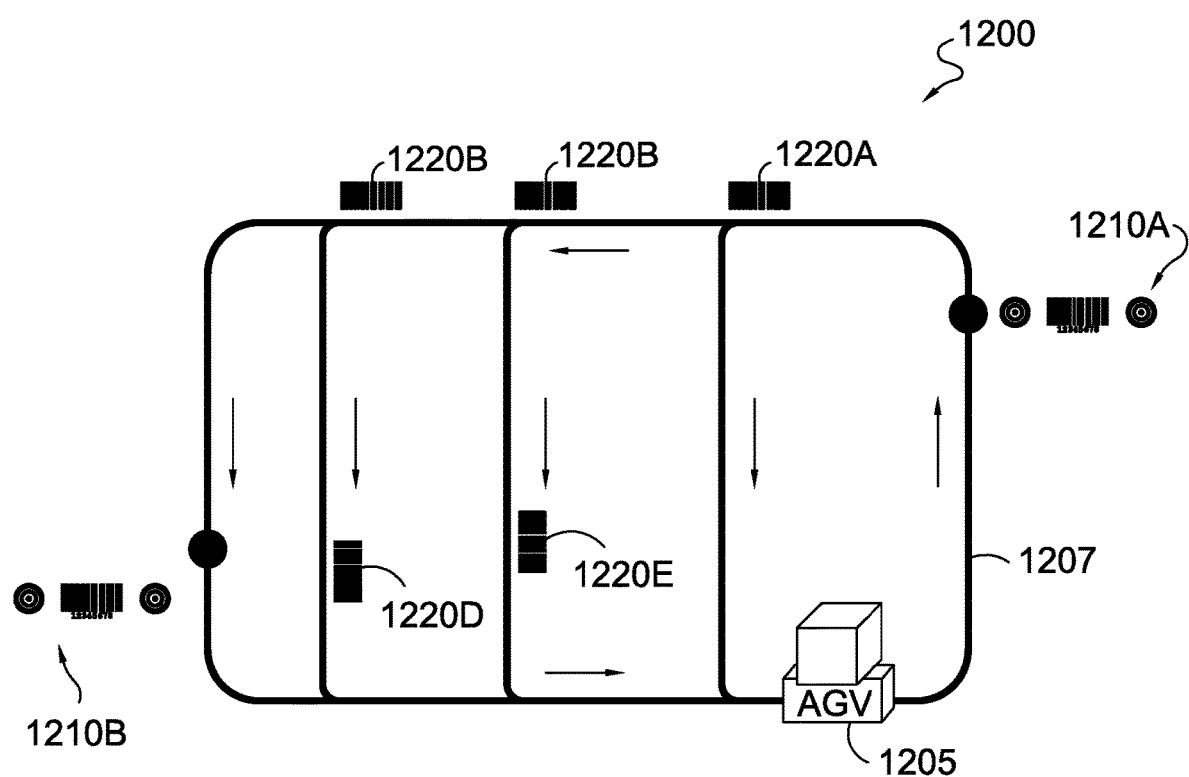
FIG. 12 is an illustration of an AGV on a track with several indicia for the AGV to encounter, implemented in accordance with an embodiment of the present invention.

In FIG. 1, an indicium 100A, such as stop indicia, is shown with ellipsoidal objects 110A and 110B and with barcode 115. Indicium 100A is indicative of the type placed on floor in an environment that has an automated guided vehicle (AGV). The AGV moves along a path and is able to scan for indicium 100A with an image reader or scanning camera that is located within the AGV. Indicium 100B is another version of the type that might be found on the floor to guide the AGV. However, indicium 100B illustrates a distortion that might occur based on the indicium being moved or damaged, or the distortion might occur after being read by the reader or camera. As one can see, the distortion appears in objects 120A and 120B as well as in barcode 125. In the context of this specification, the terms reader or camera may be used interchangeably. Also, indicia 100A and 100B may be placed throughout a floor in order to provide instruction information for the AGV as shown in FIG. 12, which shall be discussed later.

Figure 2:
FIG. 2 is an exemplary label containing barcodes and MaxiCode, implemented in accordance with an embodiment of the present invention.

Indicia 110A, 110B, 120A, and 120B can be found in shipping labels, such as label 200 in FIG. 2. In the embodiment here, indicium 220 is embedded in label 200 in MaxiCode 210. Although indicium 220 is not placed on a floor, the concept is applicable. An image reader or scanning camera can scan MaxiCode 210 with indicium 220. Similar to object 300, the ellipticity of indicium 220 will need to be calculated to obtain information, especially if label 200 is distorted in some manner.

Figure 4:
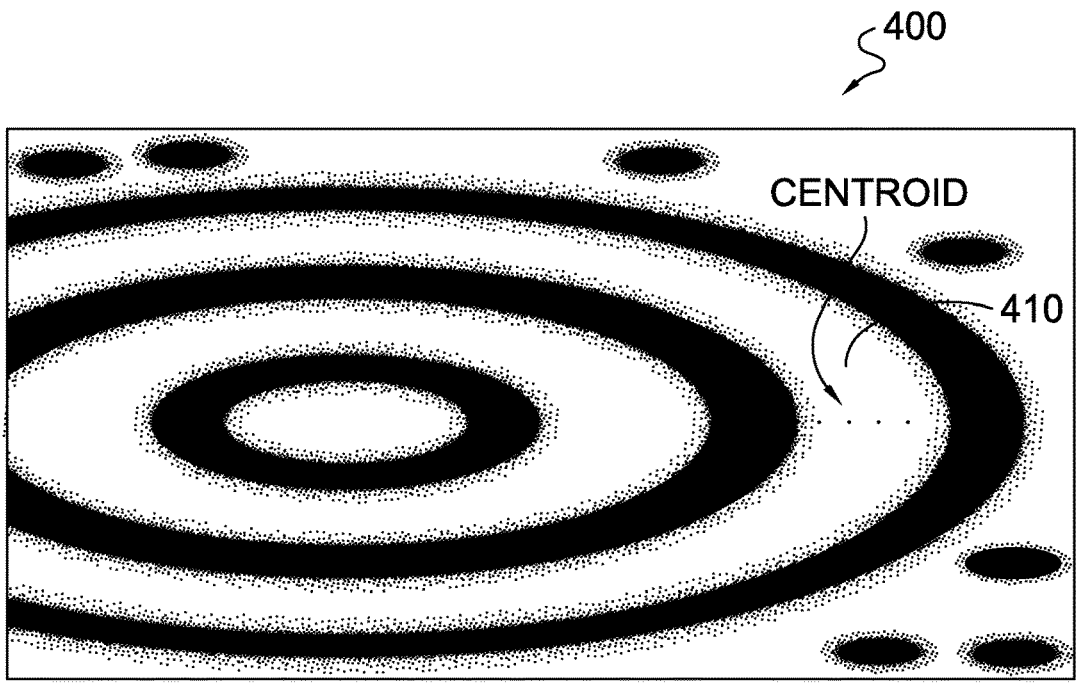
FIG. 4 is another exemplary ellipsoidal object showing a centroid, implemented in accordance with an embodiment of the present invention.

Continuing from the discussion above, a centroid is evaluated using the following formulas:

$$X_{CM} = \frac{\sum_{i=1}^{n} m_i x_i}{\sum_{i=1}^{n} m_i}$$

$$y_{CM} = \frac{\sum_{i=1}^{n} m_i y_i}{\sum_{i=1}^{n} m_i}$$

where $m_i$=grey value of sampled position i. $x_i$, $y_i$=abscissa and ordinate of sampled position i. The distance of the centroid ($x_{cm}$, $y_{cm}$) is evaluated from the center, where the distance is called DIST. See FIG. 4 where an ellipsoidal object 400 shows a DIST, which is the distance from the center of the ellipsoidal object to the centroid. The centroid is calculated using the formula above for x and y. DIST is also shown by directions 340, 350, 360, and 370. The center of the ellipsoidal object can be updated from an evaluation of the first four centroids that are calculated. For example, an average between the center and the median points of each of the two axes formed by a couple of segments is made to obtain the updated center (also known as a preliminary center or preliminary center point).

Figure 5:
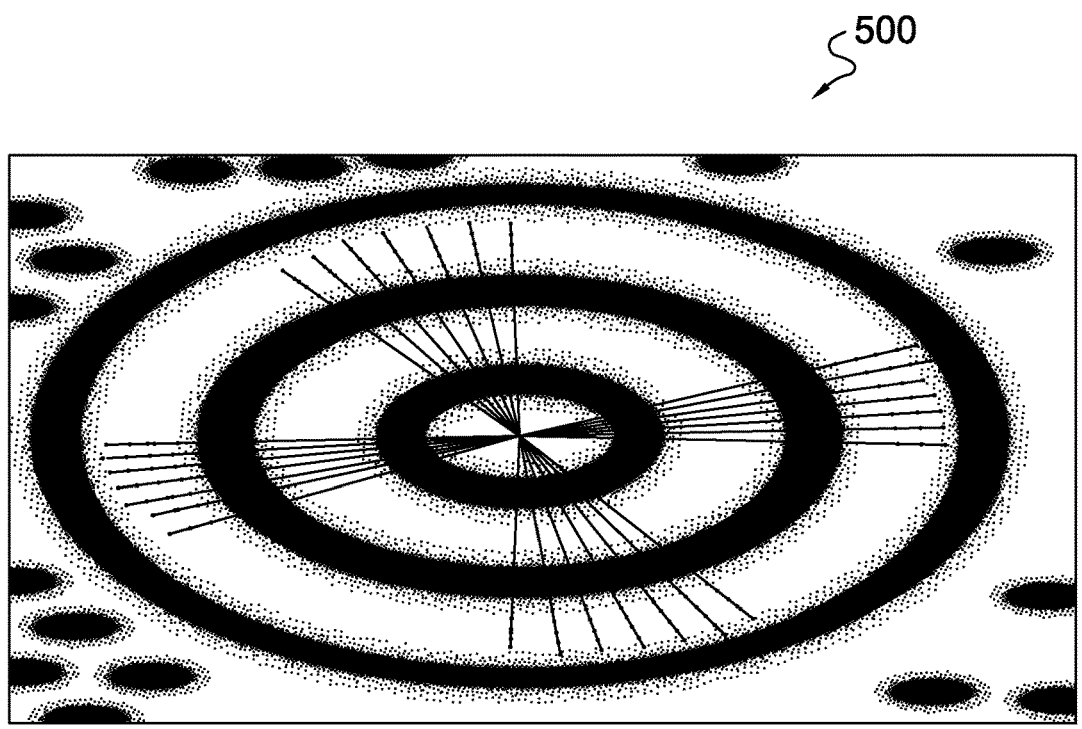
FIG. 5 is another exemplary ellipsoidal object showing the four linear directions after several iterations where each linear direction is separated by five (5) degrees, implemented in accordance with an embodiment of the present invention.

Turning now to FIG. 5, after the centroid and DIST have been calculated, where DIST is represented by four directions, which are ninety (90) degrees to each adjacent direction, the centroid is moved five (5) degrees and the formulas, discussed above, are calculated again. As shown in FIG. 5, ellipsoidal object 500 shows DIST in the form of directions where the centroid was moved five (5) degrees and the DIST was calculated again. At each step, distances are accumulated in each quadrant from the measurement of the center to the centroid. Within each quadrant, an evaluation occurs for errors. Errors are defined as 1) grey value percentage variation of the centroid from the starting value; or 2) the percentage variation of DIST from the starting distance. If errors are within a fixed range, the centroid is moved five (5) degrees and the formulas are calculated again. If an error is not within the fixed range, the calculation is stopped.

Figure 6:
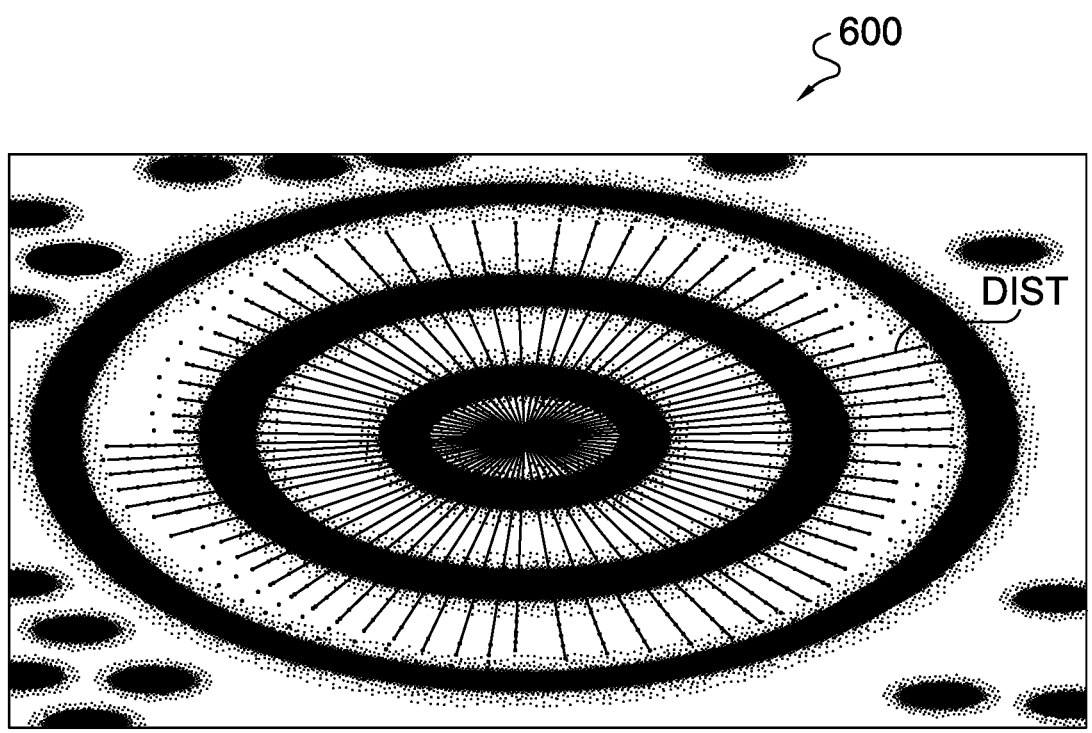
FIG. 6 is another exemplary ellipsoidal object showing the four linear directions after complete iterations where each linear direction or DIST is separated by five (5) degrees, implemented in accordance with an embodiment of the present invention.

When the quadrants are completely covered as shown in FIG. 6 in ellipsoidal object 600, the distances distribution is analyzed to set the major axis position. The minor axis position is set ninety (90) degrees to the major axis. Although the major and minor axes positions appear to be in the center of object 600, in other embodiments, if the object 600 is more elliptical or has an odd shape, the major and minor axes can be positioned differently.

Figure 7:
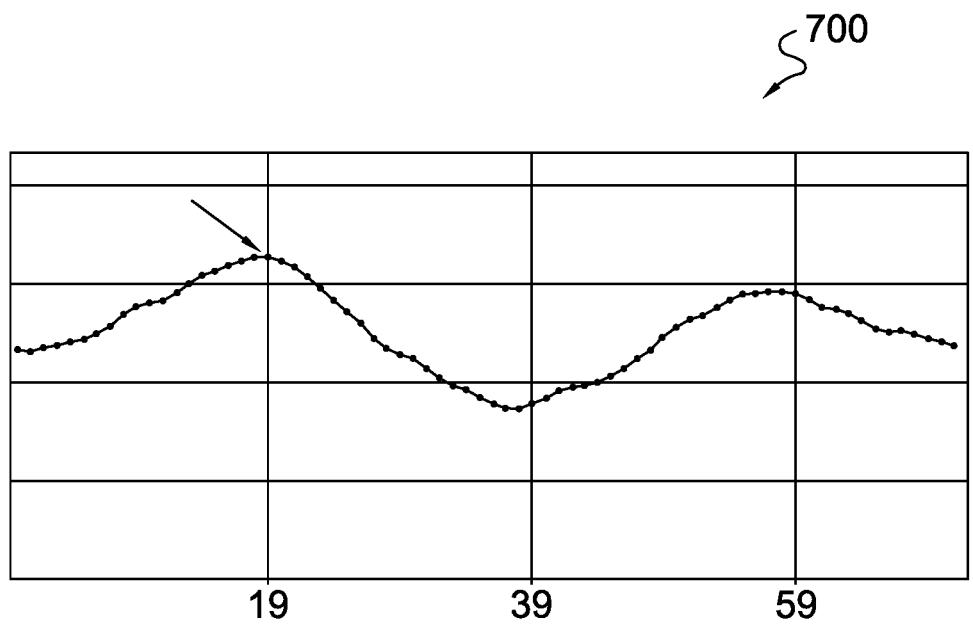
FIG. 7 is an exemplary graph showing the impact of the geometric estimation of the ellipsoidal object, implemented in accordance with an embodiment of the present invention.

In FIG. 7, an exemplary graph 700 shows centroid distances distributions. For each step, an evaluation of the centroid distance is made from the center as drawn in FIG. 6. For each step, an evaluation of the centroid distance occurs from the center as drawn in FIG. 6. On the X axis, each point (step) represents a five (5) degree displacement from the starting centroid. [72 steps×5 degrees=360 degrees].

Figure 8:
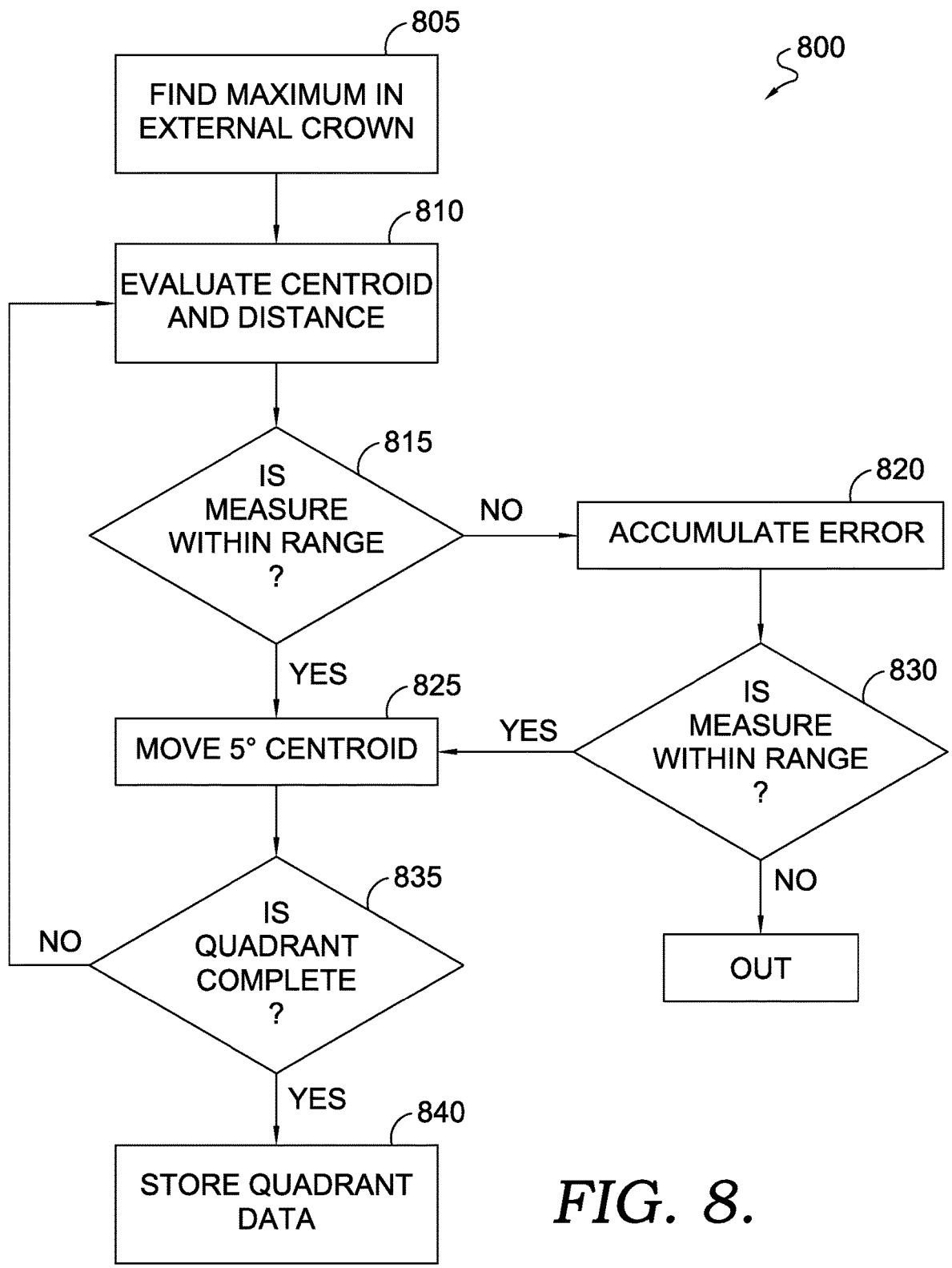
FIG. 8 is an exemplary process for performing a geometric estimation of an ellipsoidal object, implemented in accordance with an embodiment of the present invention.

Turning now to FIG. 8, a process for identifying an object is provided in a method 800. In a step 805, a maximum is found in an external crown in object 300. In a step 810, centroid 410 and distance are evaluated, where the distance is the length from the center of object 300 or 400 to centroid 410. The centroid is calculated using the formulas discussed earlier. A determination is made as to whether the measure of the distance is within a range, in a step 815. In a step 820, if the measure is not within range, an error is accumulated. In steps 825 and 830, if the measure is within range, centroid 410 is moved five (5) degrees and the calculations start over again as shown in object 500. However, in step 830, if the measure is not within range, method 800 stops. A determination is made whether a quadrant is complete, in a step 835. If the quadrant is not complete, in step 810, centroid 410 and distance are evaluated again but at a five degree deviation. If the quadrant is complete, in a step 840, quadrant data is stored and ellipsoidal object 600 will have virtual distance (DIST) marks as indicated covering the quadrant, which usually covers the entire object 600.

Figure 9:
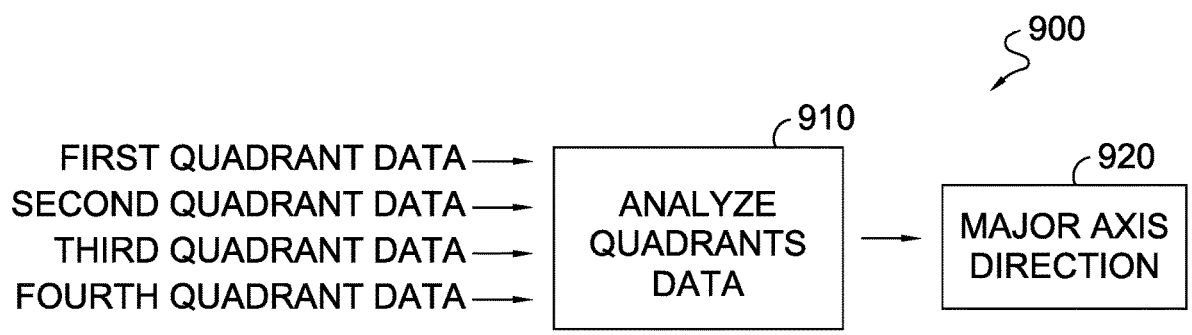
FIG. 9 is a block illustration for determining a major axis direction, implemented in accordance with an embodiment of the present invention.

In FIG. 9, a block diagram 900 illustrates first quadrant data, second quadrant data, third quadrant data, and fourth quadrant data provided into a module 910 where the quadrants' data are analyzed. From this analysis, a major axis direction is determined in 920.

Figure 10:
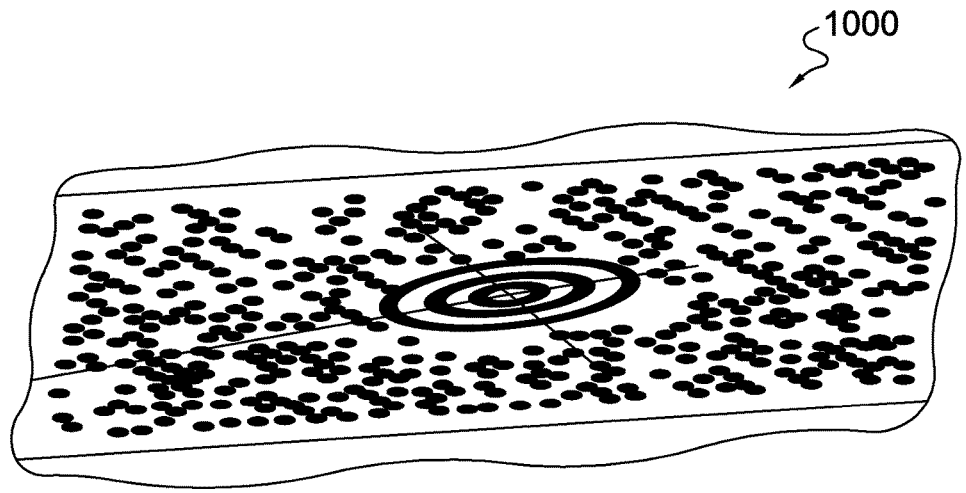
FIGS. 10 and 11 are exemplary illustrations of noisy or distorted labels encountered in accordance with an embodiment of the present invention.
Figure 11:
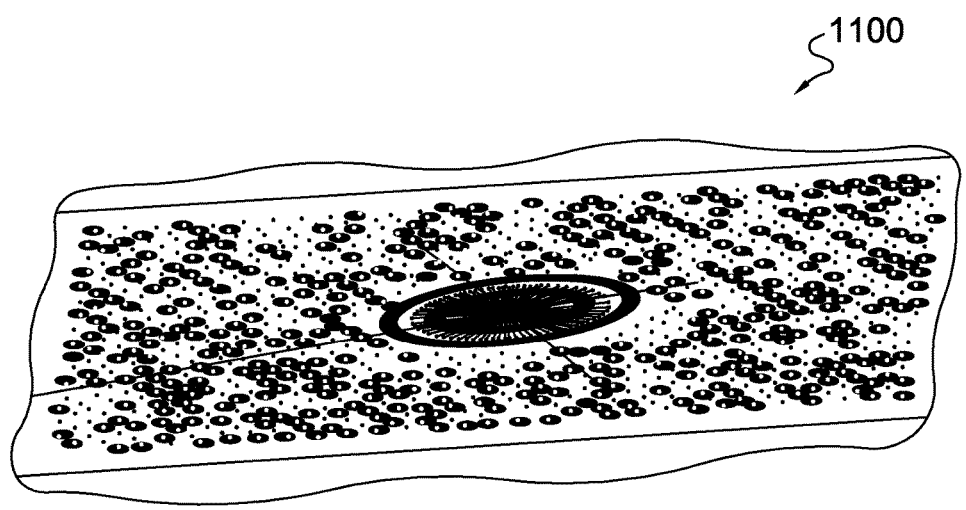

In FIGS. 10 and 11, another embodiment of the implementation of the invention is shown in a use case for MaxiCode decoding. FIGS. 10 and 11 represent a blurred or distorted label. As a result, correct estimation of the ellipse (finder pattern) geometry is a key factor in increasing decoding performances in the presence of noisy and distorted labels. The present invention can determine the elliptical pattern, which results in a higher performance for decoding the entire label.

In FIG. 12, an illustration 1200 is shown with an AGV 1205 moving around a floor along a path 1207. As mentioned earlier, AGV 1205 can have a processor with a memory, but also have an image reader or scanning camera for capturing or scanning images or items located on the floor. Start or Stop indicia 1210A and 1210B (similar to indicia 100A and 100B) may be placed throughout the floor in order to provide instruction information for AGV 1205. AGV 1205 can encounter indicia 1220A-E, where each indicium provides information for AGV 1205 to follow, such as determining which way to go at a fork in the path. AGV 1205 must interpret the start or stop indicia and other indicia correctly even if the indicia is distorted or damaged on the floor or if the capture of the indicia results in a blurred image. Reliable geometry estimation of the target indicium is required for direction and positioning correction of AGV 1205's path. The processor in AGV 1205 calculates the ellipticity involving finding the centroids and distances to determine the distances fall within a certain range, indicating the correct calculation of the ellipse. From there, the X-Y axes are found, enabling AGV 1205 to correct its alignment and aid its performance along path 1207.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

What is claimed is:

1. A method for operating a device based on evaluating a distortion of a target with concentric crowns, the method comprising:
   capturing, with an image reader of the device, an image of the target;
   determining, with a processor of the device, a preliminary center position of an ellipse with the captured image;

determining, with the processor, two perpendicular axes intersecting in the preliminary center position and four segments that identify four quadrants;
  (a) evaluating, with the processor, the grey level values of an external crown for each of said four segments;
  (b) calculating, with the processor, a centroid for each segment based on said grey level values;
  (c) calculating, with the processor, the distances between each centroid and the center;
rotating, with the processor, the segments a fixed angle;
repeating acts (a), (b), and (c) with the processor;
after a rotation of the segments a complete 360 degrees, analyzing the distances distribution with the processor;
selecting, with the processor, the maximum value as a major axis; and
modifying an operation of the device based on the determined distortion of the target, wherein the device is an Automated Guided Vehicle (AGV).

2. The method of claim 1, wherein the minor axis is set at ninety degrees to the major axis.

3. The method of claim 2, wherein the centroid is a location on an ellipsoidal object that is calculated from a set of formulas that result in an abscissa and ordinate.

4. The method of claim 3, wherein the preliminary center position is modified according at least in part with a result of the evaluation of the first four centroid positions.

5. The method of claim 2, wherein the major and minor axes of the ellipsoidal object includes an analysis of a distances distribution to set the major and minor axes position.

6. The method of claim 5, wherein the distance distribution is an evaluation of the distances between the maximum in the grey level profile and a center of an ellipsoid object, at different angular positions, wherein the distances are calculated moving from the center to a last white circular crown of a concentric elliptical pattern.

7. The method of claim 1, wherein the device is an optical reader, and further comprising determining a preliminary center position of an ellipse inside the optical reader.

8. The method of claim 1, wherein the device is an optical reader, and wherein modifying the operation of the device based on the determined distortion of the target includes decoding an optical code disposed on the target.

9. The method of claim 8, wherein the optical code is at least of a type MaxiCode, AZTEC, PDF417, Datamatrix, QR, MSI Plessy, GS1 Databar, Codabar, Code 93, Interleaved 2 of 5 (ITF), Code 128, Code 39, EAN, or UPC.

10. The method of claim 1, further comprising:
controlling movement of the AGV with the processor along a path in a direction; and
scanning for indicia on a floor to capture the image as the AGV system moves along the path.

11. The method of claim 10, wherein modifying the operation of the device based on the determined distortion of the target includes stopping movement of the AGV responsive to detecting a stop indicium and moving or rotating the AGV to a correct aligned position along the path based on the position of the geometry along the axes.

12. A system, comprising:
a device including at least one processor coupled to a memory and comprising an image reader with a camera configured to capture an image of the target, wherein the device is an Automated Guided Vehicle (AGV), wherein the at least one processor is configured to:
determine a preliminary center position of an ellipse within the captured image;
determine two perpendicular axes intersecting in the preliminary center position and four segments that identify four quadrants;
  (a) evaluate the grey level values of an external crown for each of said four segments;
  (b) calculate a centroid for each segment based on said grey level values;
  (c) calculate the distances between each centroid and the center;
rotate the segments a fixed angle;
repeat acts (a), (b), and (c);
after a rotation of the segments a complete 360 degrees, analyze the distances distribution;
select the maximum value as a major axis; and
modify an operation of the device based on the determined distortion of the target including at least modifying controlling of the movement of the AGV along a path in a direction based on the determined distortion of the target.

13. The system of claim 12, wherein the minor axis is set at ninety degrees to the major axis.

14. The system of claim 13, wherein the centroid is a location on an ellipsoidal object that is calculated from a set of formulas that result in an abscissa and ordinate.

15. The system of claim 14, wherein the preliminary center position is modified according at least in part with a result of the evaluation of the first four centroid positions.

16. The system of claim 13, wherein the major and minor axes of the ellipsoidal object includes an analysis of a distances distribution to set the major and minor axes position.

17. The system of claim 16, wherein the distance distribution is an evaluation of the distances between the maximum in the grey level profile and a center of an ellipsoid object, at different angular positions, wherein the distances are calculated moving from the center to a last white circular crown of a concentric elliptical pattern.

18. The system of claim 12, wherein at least one processor, the memory, the image reader are part of an optical code reader, and the at least one processor is further configured to modify decoding of an optical code disposed on the target based on the determined distortion of the target.

19. The system of claim 18, wherein the optical code is at least of a type of MaxiCode, AZTEC, PDF417, Datamatrix, QR, MSI Plessy, GS1 Databar, Codabar, Code 93, Interleaved 2 of 5 (ITF), Code 128, Code 39, EAN, or UPC.

* * * * *